United States Patent
Liao et al.

(10) Patent No.: US 11,907,960 B2
(45) Date of Patent: Feb. 20, 2024

(54) INTELLIGENT CLOUD DELIVERY AND BILLING METHOD AND SYSTEM FOR LOGISTICS APPARATUS

(71) Applicant: SHANGHAI HONGYAN RETURNABLE TRANSIT PACKAGINGS CO., LTD., Shanghai (CN)

(72) Inventors: Qingxin Liao, Shanghai (CN); Yupeng Sun, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 150 days.

(21) Appl. No.: 16/966,845

(22) PCT Filed: Jan. 7, 2019

(86) PCT No.: PCT/CN2019/070627
§ 371 (c)(1),
(2) Date: Jul. 31, 2020

(87) PCT Pub. No.: WO2019/149033
PCT Pub. Date: Aug. 8, 2019

(65) Prior Publication Data
US 2021/0042766 A1    Feb. 11, 2021

(30) Foreign Application Priority Data

Jan. 31, 2018  (CN) .......................... 201810096826.0

(51) Int. Cl.
*G06Q 30/00*     (2023.01)
*G06Q 30/02*     (2023.01)
(Continued)

(52) U.S. Cl.
CPC ............. *G06Q 30/02* (2013.01); *G06Q 10/08* (2013.01); *G06Q 30/06* (2013.01)

(58) Field of Classification Search
CPC .................... G06Q 30/02–0277; G06Q 30/06
See application file for complete search history.

(56) References Cited

U.S. PATENT DOCUMENTS 9,684,911 B2 * 6/2017 Audet .................... G06Q 10/06
2016/0321566 A1 * 11/2016 Liu ....................... G05D 1/0011

FOREIGN PATENT DOCUMENTS

CN     104410438 A    3/2015
CN     106296053 A    1/2017
(Continued)

OTHER PUBLICATIONS

Ip.com article titled "Estimating Active Transportation Behaviors to support Health Impact Assessment in the United States" by Mansfield et al., Frontiers in Public Health, 4, 63, May 2, 2016. (Year: 2016).*
(Continued)

*Primary Examiner* — Raquel Alvarez
(74) *Attorney, Agent, or Firm* — HAMRE, SCHUMANN, MUELLER & LARSON, P.C.

(57) ABSTRACT

The application relates to the field of logistics, and discloses an intelligent cloud delivery and billing method and system for logistics apparatus to solve the problem of low delivery efficiency of the logistics apparatus in the case of mixed storage of logistics apparatuses of multiple users. In the present invention, the logistics apparatuses of a first user and other users are mixedly stored in a first area; a server receives uploaded identifications of the N logistics apparatuses, and these N logistics apparatuses are arbitrarily selected from the first area; the server adjusts the N logistics apparatuses involving in the physical delivery to belong to a second user according to the identifications of the N logistics apparatuses involving in the physical delivery, and
(Continued)

adjusts belonging relationships of the logistics apparatuses except the N logistics apparatuses involving in the physical delivery in the first area.

14 Claims, 2 Drawing Sheets

(51) Int. Cl.
*G06Q 10/08* (2023.01)
*G06Q 30/06* (2023.01)

(56) References Cited

FOREIGN PATENT DOCUMENTS

| | | | |
|---|---|---|---|
| CN | 107481112 A | 12/2017 | |
| CN | 107527266 A | 12/2017 | |
| WO | WO-2006068076 A1 * | 6/2006 | ........... G06Q 10/087 |
| WO | 2016138879 A1 | 9/2016 | |

OTHER PUBLICATIONS

Office Action issued in corresponding Chinese Application No. CN20181096826, dated Aug. 4, 2021, with English machine translation.

The extended European search report issued in European Application No. 19747945.4, dated Sep. 27, 2021.

International Search Report and Written Opinion issued in PCT/CN2019?070627, dated Apr. 11, 2019, with English translation, total 14 pages.

* cited by examiner

INTELLIGENT CLOUD DELIVERY AND BILLING METHOD AND SYSTEM FOR LOGISTICS APPARATUS

TECHNICAL FIELD

The application relates to the field of logistics, in particular to the delivery technology for logistics apparatus.

BACKGROUND

In order to reduce use cost of recyclable logistics apparatus, a method of time-sharing rent of the logistics apparatus can be adopted. In the scenario of logistics apparatus rental, multiple users may rent the same type of the logistics apparatus, which are mixedly stored in the same storage point (such as a warehouse). If N logistics apparatuses in the empty state rented by a first user are required to deliver to a second user, N logistics apparatuses belonging to the first user are need to been firstly selected from the mixedly stored logistics apparatuses, which is a time-consuming and laborious task, especially when the logistics apparatuses belonging to different users are of the same type. For example, a selection method is to scan a code (such as a barcode or a QR code) for each logistics apparatus, and determine whether the logistics apparatus belongs to the first user according to the result of the scan code, which is time-consuming and laborious. For another example, another selection is to paste ID of the user on the logistics apparatus, if the ID is more eye-catching, it may be more convenient to select; but this will bring new problems, when the logistics apparatuses are delivered, it is necessary to affix new ID of the user on the logistics apparatus to the delivered and clear old ID of the user, which is time-consuming and laborious.

It can be seen that when the logistics apparatuses belonging to different users are mixedly stored, especially when these logistics apparatuses are difficult to distinguish from the appearance, the existing technology cannot achieve efficient delivery of the logistics apparatus.

SUMMARY OF THE INVENTION

The purpose of the application is to provide an intelligent cloud delivery and billing method and system for logistics apparatus, so as to solve the problem of low delivery efficiency of logistics apparatus in the case of mixed storage of the logistics apparatuses of multiple users.

In order to solve the above problems, the application discloses an intelligent cloud delivery method for logistics apparatus, logistics apparatuses of a first user and other users are mixedly stored in a first area, the method comprising:

receiving, by a server, identifications of N logistics apparatuses uploaded by a terminal, the identifications of the N logistics apparatuses are identifications of N logistics apparatuses actually selected from the mixedly stored first area and involving in physical delivery when the N logistics apparatuses of the first user need to be physically delivered to a second user, wherein N is a positive integer;

adjusting, by the server, the N logistics apparatuses involving in the physical delivery to belong to the second user according to the identifications of the N logistics apparatuses involving in the physical delivery;

adjusting, by the server, belonging relationships of the logistics apparatuses in the first area except the N logistics apparatuses involving in the physical delivery.

In a preferred example, among the identifications of the N logistics apparatuses involving in the physical delivery, there are logistics apparatuses corresponding to M identifications that do not belong to the first user before delivery, wherein M is a positive integer not greater than N.

In a preferred example, wherein the step of adjusting by the server belonging relationships of the logistics apparatuses in the first area except the N logistics apparatuses involving in the physical delivery, comprising selecting M logistics apparatuses from the logistics apparatuses belonging to the first user, and adjusting the selected M logistics apparatuses to belong to the other users.

In a preferred example, the step of adjusting by the server belonging relationships of the logistics apparatuses in the first area except the N logistics apparatuses involving in the physical delivery, comprising:

resetting belonging relationships of the logistics apparatuses in the first area except the N logistics apparatuses involving in the physical delivery according to numbers of the logistics apparatuses that each user should own.

In a preferred example, the selection is to randomly select N logistics apparatuses among the logistics apparatuses mixedly stored in the first area for physical delivery.

In a preferred example, the selection is to select N mutually adjacent logistics apparatuses among the logistics apparatuses mixedly stored in the first area for physical delivery.

In a preferred example, the step of adjusting the N logistics apparatuses involving in the physical delivery to belong to the second user, comprising: resetting the identifications of the N logistics apparatuses involving in the physical delivery;

the step of adjusting by the server belonging relationships of the logistics apparatuses in the first area except the N logistics apparatuses involving in the physical delivery, comprising: resetting one or more identifications of logistics apparatuses in the first areas except the N logistics apparatuses involving in the physical delivery.

In a preferred example, the physical delivery is triggered by one of the following conditions:

the N logistics apparatuses have transferred property rights and left an agreed area;

the N logistics apparatuses have transferred property rights and reached an agreed area;

the N logistics apparatuses have transferred property rights and changed from empty state to full state.

In a preferred example, the logistics apparatuses are logistics apparatus in empty state.

The application also discloses billing method for logistics apparatus rental, comprising:

performing, intelligent cloud delivery for logistics apparatus according to the method described above, wherein when adjusting belonging relationships of the logistics apparatuses, resetting the identifications of the logistics apparatuses whose belonging relationships are adjusted, and recording historical records of resetting the identifications of the logistics apparatuses;

querying, usage period of the logistics apparatuses rented by a user of the logistics apparatuses according to the historical records;

billing, the user of the logistics apparatus according to the usage period.

The application also discloses n intelligent cloud delivery system for logistics apparatus, a receiver module, configured to receive identifications of N logistics apparatuses uploaded by a terminal, wherein the identifications of the N logistics apparatuses are identifications of N logistics apparatuses actually selected from the mixedly stored first area and involving in physical delivery when N logistics apparatuses of the first user need to be physically delivered to a second user, the logistics apparatuses of a first user and other users are mixedly stored in a first area, N is a positive integer;

a first adjustment module, configured to adjust the N logistics apparatuses involving in the physical delivery to belong to the second user according to the identifications of the N logistics apparatuses involving in the physical delivery;

a second adjustment module, configured to adjust belonging relationships of the logistics apparatuses in the first area except the N logistics apparatuses involving in the physical delivery.

Compared with the prior art, the implementation of the present application does not need to identify the belonging relationships of the logistics apparatuses before delivery in the case of mixed storage of the logistics apparatuses of multiple users, which can greatly improve delivery efficiency of the logistics apparatus.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute Various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

Figure 1:
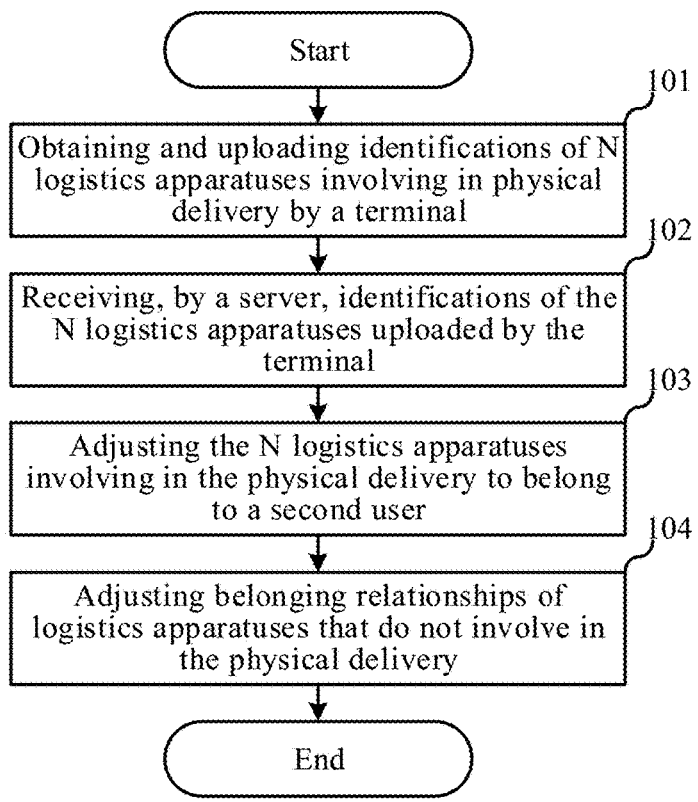
FIG. 1 is a schematic flowchart of an intelligent cloud delivery method for logistics apparatus in the first embodiment of the present application.

In the following description, numerous technical details are set forth in order to provide the reader with a better understanding of the present application. However, those skilled in the art can understand that the technical solutions claimed in the present application can be implemented without these technical details and various changes and modifications based on the following embodiments.

Explanation of Some Concepts:

Identification (ID) of a logistics apparatus is a logical identification assigned by a system to each logistics apparatus, and is used to uniquely identify the logistics apparatus and can be changed. For example, the identification of the logistics apparatus may contain information of the user, when the logistics apparatus is delivered from one user to another user, the identification of the logistics apparatus needs to be reset.

Server: refers to a computer system that can provide certain services to other machines in a network. An object served by the server is usually called as client (or terminal). The server and the client can be connected via wired or wireless communication. In embodiments of the present application, the server may be just one computer, or a logical server system composed of multiple computers with different functions, or a computer system composed of a computer and external storage devices and other external devices, or a computer cluster, or may be in the form of a cloud server.

Empty state: refers to a state of the logistics apparatus when no cargos are loaded.

Correspondence: refers to corresponding relationship between two or more data, usually stored in a storage device (such as storage servers, hard disks, memory, etc.), its specific forms may be various, for example, may be a file representing the corresponding relationship, or a table in a database, and so on.

Recyclable logistics apparatus: refers to reusable logistics apparatus which can be loaded with solid or liquid substances, or packaged gaseous substances. Typically, after the empty apparatus is transported to the consignor, loading cargo in it, and then the full apparatus is transported to the consignee, unloading the cargo, and the apparatus returning to the empty state can be reused again. The technical solution in the application is particularly suitable for application in recyclable logistics apparatus.

The following is a summary of some of the innovations of the application:

When N logistics apparatuses belonging to a first user need to be physically delivered to a second user, before delivery, the mixedly stored logistics apparatuses belonging to multiple users will not be pre-identified and selected, but directly selecting N logistics apparatuses involving in physical delivery in any way from the mixedly stored logistics apparatuses. Uploading the identifications of the selected N logistics apparatuses to a server, and the server will directly adjust these N logistics apparatuses to belong to the second user regardless of their original belonging relationships; and adjusting the belonging relationships of these remaining logistics apparatuses in the originally mixedly stored logistics apparatuses, so that compared with the belonging relationships before the physical delivery, the number of the logistics apparatuses belonging to the first user is reduced by N, and the numbers of the logistics apparatuses belonging to other users remain unchanged. By adjusting the belonging relationships of the logistics apparatuses in the cloud, the physical selection process of the logistics apparatuses is avoided, thereby greatly improving the delivery efficiency of the logistics apparatus.

In order to make the objects, technical solutions, and advantages of the present application clearer, embodiments of the present application will be further described in detail below with reference to the accompanying drawings.

The first embodiment of the present invention relates to an intelligent cloud delivery method for logistics apparatus. FIG. 1 is a schematic flow diagram of the intelligent cloud delivery method for the logistics apparatus. In the intelligent cloud delivery method for the logistics apparatus, logistics apparatuses belonging to a first user and other users are mixedly stored in a first area, and the method includes the following steps:

Step 101: obtaining and uploading identifications of N logistics apparatuses involving in physical delivery by a terminal. Wherein, the identifications of the N logistics apparatuses are identifications of N logistics apparatuses actually selected from the mixedly stored first area and involving physical delivery when the N logistics apparatuses of the first user need to be physically delivered to a second user, wherein N is a positive integer. In other words, the N logistics apparatuses are selected firstly in an arbitrary manner from the mixedly stored first area for delivery, so as to realize the physical delivery of the N logistics apparatuses of the first user to a second user. Among the identifications of the N logistics apparatuses involving in the physical delivery, there are logistics apparatuses corresponding to M identifications that do not belong to the first user before delivery, wherein M is a positive integer not greater than N.

Step 102: receiving by a server the identifications of the N logistics apparatuses uploaded by the terminal.

Step 103: adjusting by the server the N logistics apparatuses involving in the physical delivery to belong to a second user according to the identifications of the N logistics apparatuses involving in the physical delivery.

Step 104: adjusting by the server belonging relationships of the logistics apparatuses in the first area except the N logistics apparatuses involving in the physical delivery.

By adopting the above technical solution, there is no need to identify the belonging relationships of the logistics apparatuses before delivery in the case of mixed storage of the logistics apparatuses of multiple users, which can greatly improve the delivery efficiency of the logistics apparatus.

In step 101, the implementation methods of uploading the identifications of the N logistics apparatuses involving in the physical delivery by the terminal may be various. Optionally, each logistics apparatus is provided with an intelligent module with wireless communication function, and the intelligent module servers as the terminal to upload its own identification through a wireless network after determining that the logistics apparatus where it is in involves in the physical delivery. Optionally, each logistics apparatus is provided with a Bluetooth module to transmit the identification of the logistics apparatus. A staff uses a smart phone (as the terminal) to receive the identifications transmitted by the N logistics apparatuses involving in the physical delivery, and upload them to the server through a mobile communication network. Optionally, each logistics apparatus is provided with an RFID chip. A staff uses an RFID reading device to read the identifications transmitted by the N logistics apparatuses involving in the physical delivery. The RFID reading device serves as the terminal to upload the identifications of the logistics apparatus through WIFI and Internet to the server. Optionally, each logistics apparatus is provided with a QR code which contains the identification of the logistics apparatus. A staff uses the camera on an iPad to read the identifications transmitted by the N logistics apparatuses involving in the physical delivery. The iPad serves as the terminal to upload the identifications of the logistics apparatuses through WIFI and Internet to the server.

In step 104, the implementation methods of adjusting the belonging relationships of the logistics apparatuses that do not involve in the physical delivery may be various. For example, optionally, in step 104, selecting M logistics apparatuses from the logistics apparatuses belonging to the first user, and adjusting the selected M logistics apparatuses to belong to the other users. Optionally, in step 104, resetting the belonging relationships of the logistics apparatuses in the first area except the N logistics apparatuses involving in the physical delivery according to the numbers of logistics apparatuses that each user should own.

When selecting M logistics apparatuses from the mixedly stored first area to involve in the actual delivery, the selection methods may be various. Optionally, N logistics apparatuses are randomly selected among the logistics apparatuses mixedly stored in the first area for the physical delivery. Optionally, N mutually adjacent logistics apparatuses are selected among the logistics apparatuses mixedly stored in the first area for the delivery. Optionally, preferentially selecting logistics apparatuses of the first user, but when the logistics apparatuses of the first user cannot be found nearby at once, the logistics apparatuses of other users may be selected according to the principle of random or nearest.

The implementation methods of step 103 may also be various. Preferably, resetting the identifications of the N logistics apparatuses involving in the physical delivery. The identification before resetting may contain the information of the first user, and the identification after resetting may contain the information of the second user. And recording the time when resetting the identification. In this way, the user to which the apparatus belongs can be immediately known from the identification itself, and other subsequent processing, such as timing or billing, can be facilitated. Optionally, establishing correspondence between the identifications of N logistics apparatuses and the second user in the database.

The implementation methods of step 104 may also be various. Preferably, selecting M logistics apparatuses from the remaining logistics apparatuses currently attributable to the first user in the first area, and resetting the identifications of these M logistics apparatuses to other users. Optionally, resetting all the identifications for the remaining logistics apparatuses in the first area, and the resetting method is not limited, as long as the numbers of logistics apparatuses owned by each user are correct after resetting. Optionally, in the database, adjusting the correspondence between the identifications of the remaining logistics apparatuses and the user identifications of each user, so that the numbers of the logistics apparatuses owned by each user are correct.

The trigger conditions for physical delivery may be various. For example, the physical delivery may be triggered by one of the following conditions the N logistics apparatuses have transferred property rights and left an agreed area.

the N logistics apparatuses have transferred property rights and reached an agreed area;

the N logistics apparatuses have transferred property rights and changed from empty state to full state.

The logistics apparatuses involving in the physical delivery are preferably the logistics apparatuses in the empty state, and this requirement is not required in certain scenarios. The identifying methods of the empty state of logistics apparatus may be various. Optionally, the logistics apparatus is foldable, and the folded logistics apparatus is empty. Optionally, the logistics apparatus is nestable, and the nested logistics apparatus is empty. Optionally, a sensor is provided in the logistics apparatus, and the status of the sensor can automatically determine whether the logistics apparatus is empty.

These logistics apparatuses belonging to different users may be of the same type, or although they are not the same type, the basic functions and appearances are not much different, and it is difficult to distinguish them from the appearance.

Figure 2:
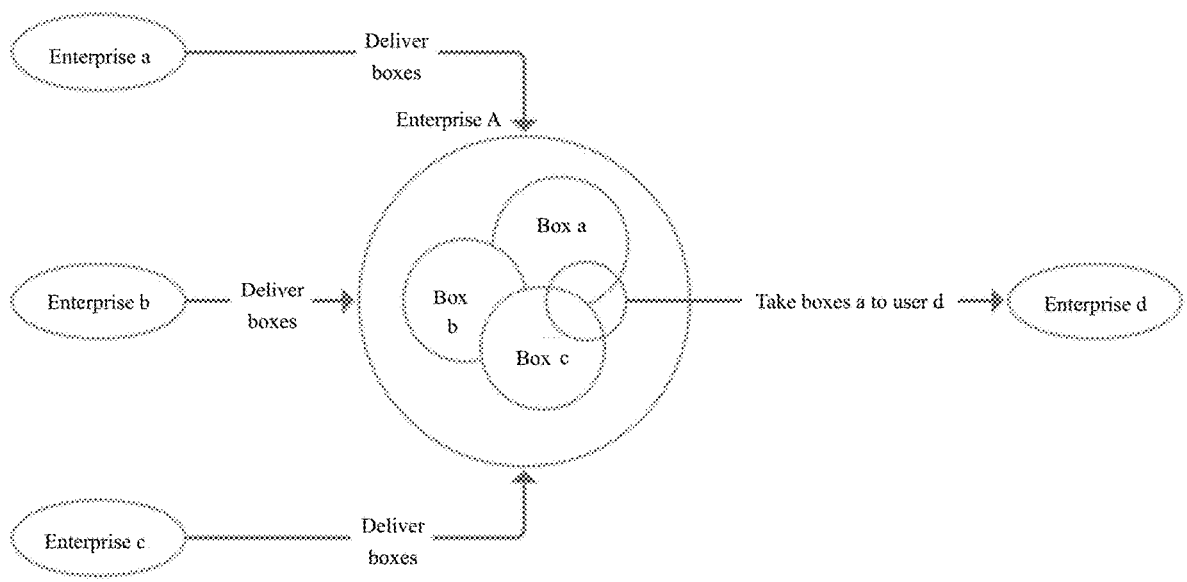
FIG. 2 is a schematic diagram of turnover of logistics apparatus among users in an embodiment of the application.
Figure 3:
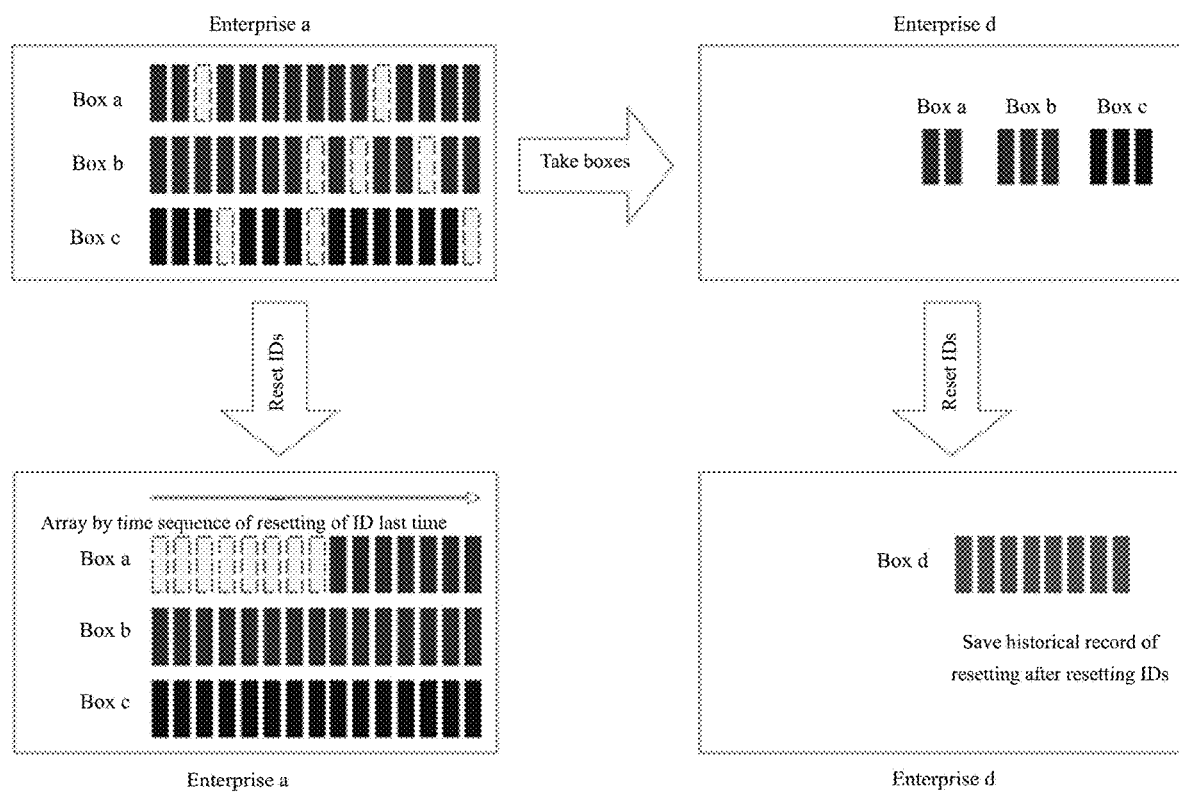
FIG. 3 is a schematic diagram of the identification reset of the logistics apparatuses during cloud delivery in an embodiment of the present application.

An example of the implementation is described below:

FIG. 2 and FIG. 3 show the general principles of flow of the logistics apparatuses and resetting of the identification related to the delivery process of the logistics apparatuses to help understanding. The "box" in the figures represents the logistics apparatus.

When cargo right of the logistics apparatus changes and the location information changes to a specific place, the logistics apparatus in two places will be reassigned ID number (identification) code at the same time to record the corresponding change information.

When the logistics apparatus leaves a factory, the cloud server assigns an ID number to each logistics apparatus, which corresponds to the physical box number of each logistics apparatus.

After multiple times turnover and transportation of the logistics apparatus, there may be logistics apparatuses of multiple upstream companies (hereinafter referred to as user a, user b, and user c) at the same downstream enterprise user (hereinafter referred to as user A). These logistics apparatuses are mixed with each other, and their cargo rights belong to the user a, user b and user c respectively.

When user a needs to deliver part of his own logistics apparatuses from the user A to another enterprise (hereinafter referred to as enterprise d) at another place, at the same time, the cargo rights of the logistics apparatuses are transferred from user a to user d.

The logistics provider arbitrarily takes the corresponding number of the logistics apparatuses (including logistics apparatus of user a, logistics apparatus of user b, and logistics apparatus of user c) and transports them to place d. At this time, the cloud backend reassigns a new ID number respectively for these logistics apparatuses. The ID number records resetting time of the ID number for the logistics apparatuses of user a and the belonging relationships information of the cargo (that is, user d).

The ID number of user b and user c for these taken logistics apparatuses (that is, logistics apparatuses that have been taken wrong) are reset to the logistics apparatus of user a that have not been taken at A, which is equivalent that cargo rights of the logistics apparatuses of user a are transferred to user b and user c that been taken wrong at A.

Another ID number resetting scheme: the logistics apparatuses delivered to place d and all the remaining logistics apparatuses at place A are reset according to the rules.

When the transfer of cargo rights occurs, the logistics apparatuses delivered by the original company default to reset the ID number from the logistics apparatus with the earliest ID number resetting time last time.

In the historical reset record of the ID number, the usage period of each logistics apparatus renting by each user can be queried at any time. According to billing standard of rental contract signed by the user and the company, the cost details for each rent are automatically generated to facilitate rent management for the company.

In the above embodiment, when the logistics apparatuses are mixed with each other and the belonging relationships of the cargo rights cannot be identified, the belonging relationships of the cargo rights can be reassigned for the logistics apparatuses of the same type by resetting the ID number, and at the same time, the corresponding usage time of each owner of cargo right is recorded.

The main points of the above embodiment are:

1) when cargo right of the logistics apparatus changes and the location information changes to a specific place, the logistics apparatus in two places will be reassigned ID number (identification) code at the same time to record the corresponding change information.

2) each ID number reset record is saved in the server side.

3) the physical box number of the logistics apparatus (identification number that uniquely identifies a logistics apparatus and does not change over time) corresponds to the ID number. The physical box number can be queried according to the ID number. On the contrary, all the historical record of the ID number can be queried according to the physical box number.

The second embodiment of the present invention relates to a billing method for logistics apparatus. The billing method for the logistics apparatus comprises:

Performing intelligent cloud delivery for logistics apparatus according to the method described in the first embodiment, wherein when adjusting belonging relationships of the logistics apparatuses, resetting the identifications of the logistics apparatuses whose belonging relationships are adjusted, and recording historical records of resetting the identifications of the logistics apparatuses.

Querying usage period of the logistics apparatuses rented by a user of the logistics apparatuses according to the historical records.

Billing the users of the logistics apparatuses according to the usage period.

The third embodiment of the present invention relates to an intelligent cloud delivery system for logistics apparatus. A receiving module of the intelligent cloud delivery system for logistics apparatus is configured to receive identifications of N logistics apparatuses uploaded by a terminal, wherein the identifications of the N logistics apparatuses are identifications of N logistics apparatuses actually selected from the mixedly stored first area and involving in physical delivery when N logistics apparatuses of the first user need to be physically delivered to a second user, the logistics apparatuses of a first user and other users are mixedly stored in a first area, N is a positive integer. Among the identifications of the N logistics apparatuses involving in the physical delivery, the logistics apparatuses corresponding to M identifications do not belong to the first user before delivery, wherein M is a positive integer not greater than N.

A first adjustment module is configured to adjust by the N logistics apparatuses involving in the physical delivery to belong to the second user according to the identifications of the N logistics apparatuses involving in the physical delivery.

A second adjustment module is configured to adjust belonging relationships of the logistics apparatuses in the first area except the N logistics apparatuses involving in the physical delivery.

The implementation manners of adjusting the identifications of the logistics apparatuses that do not involve in the physical delivery of the second adjustment module may be various. Optionally, preferably, selecting M logistics apparatuses from the remaining logistics apparatuses currently attributable to the first user in the first area, and resetting the identifications of these M logistics apparatuses to other users. Optionally, resetting all the identifications for the remaining logistics apparatuses in the first area, and the resetting method is not limited, as long as the numbers of logistics apparatuses owned by each user are correct after resetting. Optionally, in the database, adjusting the correspondence between the identifications of the remaining logistics apparatus and the user identifications of each user, so that the numbers of logistics apparatuses owned by each user are correct.

When selecting M logistics apparatuses from the first area of mixed storage to involve in the actual delivery, the selection methods may be various. Optionally, N logistics apparatuses are randomly selected among the logistics apparatuses mixedly stored in the first area for physical delivery. Optionally, N mutually adjacent logistics apparatus are selected among the logistics apparatuses mixedly stored in the first area for physical delivery. Optionally, selecting logistics apparatuses of the first user firstly, but when the logistics apparatuses of the first user cannot be found nearby at once, the logistics apparatuses of other users may be selected according to the principle of random or nearest.

The first embodiment is a method embodiment corresponding to this embodiment, and this embodiment can be implemented in cooperation with the first embodiment. The relevant technical details mentioned in the first embodiment are still valid in this embodiment, and in order to reduce repetition, they will not be repeated here. Correspondingly, the relevant technical details mentioned in this embodiment can also be applied in the first embodiment.

Each method implementation of the present invention can be implemented in software, hardware, firmware, and so on. Regardless of whether the invention is implemented in software, hardware, or firmware, the instruction code can be stored in any type of computer-accessible memory (e.g., permanent or modifiable, volatile or non-volatile, solid-state or non-solid, fixed or replaceable media, etc.). Similarly, the memory may be, for example, Programmable Array Logic ("PAL"), Random Access Memory ("RAM"), Programmable Read Only Memory ("PROM"), Read-Only Memory ("ROM"), Electrically Erasable Programmable ROM ("EEPROM"), magnetic disks, CDs, and Digital Versatile Discs ("DVD") and so on.

It should be noted that the units mentioned in the device embodiments of the present invention are logical units. Physically, a logical unit may be a physical unit, or may be a part of a physical unit, or multiple physical units for the combination of units, the physical implementation of these logical units is not the most important. The combination of the functions implemented by these logical units is the key to solving the technical problems proposed by the present invention. In addition, in order to highlight the innovative part of the present invention, the above device embodiments of the present invention do not introduce units that are not closely related to solving the technical problems proposed by the present invention, which does not mean that the above device embodiments do not exist other unit.

It should be noted that in the application documents of the present patent, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also Other elements, or elements that are inherent to such a process, method, item, or device. Without more restrictions, the element defined by the phrase "include one" does not exclude that there are other identical elements in the process, method, article, or equipment that includes the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents referred to in this application are considered to be included in the disclosure of the present application as a whole, so as to serve as a basis for modification as necessary. In addition, it should be understood that various changes and modifications may be made by those skilled in the art after reading the above disclosure of the present application.

What is claimed is:

1. An intelligent cloud delivery method for logistics apparatus, wherein logistics apparatuses of a first user and other users are mixedly stored in a first area, the method comprising:
   receiving, by a server, identifications of N logistics apparatuses uploaded by a terminal, the identifications of the N logistics apparatuses are identifications of N logistics apparatuses actually selected from the mixedly stored first area and involving in physical delivery when the N logistics apparatuses of the first user are need to be physically delivered to a second user, wherein N is a positive integer;
   adjusting, by the server, the N logistics apparatuses involving in the physical delivery to belong to the second user according to the identifications of the N logistics apparatuses involving in the physical delivery, adjusting the N logistics apparatuses involved in the physical delivery comprises: resetting the identifications of the N logistics apparatuses involved in the physical delivery by the server; and
   adjusting, by the server, belonging relationships of the logistics apparatuses in the first area except the N logistics apparatuses involving in the physical delivery,
   wherein the identifications of the N logistics apparatuses in the physical delivery include logistics apparatuses corresponding to M identifications that do not belong to the first user before delivery, wherein M is a positive integer not greater than N.

2. The intelligent cloud delivery method for logistics apparatus according to claim 1, wherein the step of adjusting by the server belonging relationships of the logistics apparatuses in the first area except the N logistics apparatuses involving in the physical delivery, comprising:
   selecting M logistics apparatuses from the logistics apparatuses belonging to the first user, and adjusting the selected M logistics apparatuses to belong to the other users.

3. The intelligent cloud delivery method for logistics apparatus according to claim 1, wherein the step of adjusting by the server belonging relationships of the logistics apparatuses in the first area except the N logistics apparatuses involving in the physical delivery, comprising:
   resetting belonging relationships of the logistics apparatuses in the first area except the N logistics apparatuses involving in the physical delivery according to numbers of the logistics apparatuses that each user should own.

4. The intelligent cloud delivery method for logistics apparatus according to claim 1, wherein the selection is to randomly select N logistics apparatuses among the logistics apparatuses mixedly stored in the first area for physical delivery.

5. The intelligent cloud delivery method for logistics apparatus according to claim 1, wherein the selection is to select N mutually adjacent logistics apparatuses among the logistics apparatuses mixedly stored in the first area for physical delivery.

6. The intelligent cloud delivery method for logistics apparatus according to claim 1,
the step of adjusting by the server belonging relationships of the logistics apparatuses in the first area except the N logistics apparatuses involving in the physical delivery, comprising: resetting one or more identifications of logistics apparatuses in the first areas except the N logistics apparatuses involving in the physical delivery.

7. The intelligent cloud delivery method for logistics apparatus according to claim 1, wherein the physical delivery is triggered by one of the following conditions:
the N logistics apparatuses have transferred property rights and left an agreed area;
the N logistics apparatuses have transferred property rights and reached an agreed area;
the N logistics apparatuses have transferred property rights and changed from empty state to full state.

8. The intelligent cloud delivery method for logistics apparatus according to claim 1, wherein the logistics apparatuses are logistics apparatus in empty state.

9. A billing method for logistics apparatus rental, wherein comprising:
performing, intelligent cloud delivery for logistics apparatus according to the method of claim 1, wherein when adjusting belonging relationships of the logistics apparatuses, resetting the identifications of the logistics apparatuses whose belonging relationships are adjusted, and recording historical records of resetting the identifications of the logistics apparatuses;
querying, usage period of the logistics apparatuses rented by a user of the logistics apparatuses according to the historical records;
billing, the user of the logistics apparatus according to the usage period.

10. The intelligent cloud delivery method for logistics apparatus according to claim 1, wherein the logistics apparatuses mixedly stored in the first area include one or more logistics apparatuses of the first user and one or more logistics apparatuses of at least one of the other users.

11. The intelligent cloud delivery method for logistics apparatus according to claim 1, wherein the logistics apparatuses mixedly stored in the first area are of the same type.

12. The intelligent cloud delivery method for logistics apparatus according to claim 1, wherein the logistics apparatuses mixedly stored in the first area have similar basic functions and appearances.

13. The intelligent cloud delivery method for logistics apparatus according to claim 1, further comprising: receiving a request from the second user for N logistics apparatuses from the first user.

14. The intelligent cloud delivery method for logistics apparatus according to claim 1, wherein adjusting the N logistics apparatuses involved in the physical delivery comprises: resetting the identifications of the N logistics apparatuses involved in the physical delivery by the server.

* * * * *